United States Patent
Holmstrom, Jr.

[11] 3,854,540
[45] Dec. 17, 1974

[54] VEHICLE WEIGHING MEANS

[76] Inventor: Godfrey A. Holmstrom, Jr., 895 S.W. Cedar Glade, Issaquah, Wash.

[22] Filed: Aug. 3, 1973

[21] Appl. No.: 385,288

[52] U.S. Cl. ............... 177/136, 177/211, 73/141 A
[51] Int. Cl. ........................................... G01g 19/08
[58] Field of Search ......................... 177/136–139, 177/210–211, 208; 73/141 A

[56] References Cited
UNITED STATES PATENTS

| | | | |
|---|---|---|---|
| 2,867,433 | 1/1959 | Bergenheim | 177/208 |
| 3,146,839 | 4/1969 | Carlson | 177/136 |
| 3,150,729 | 9/1964 | Mehki | 177/208 X |
| 3,252,532 | 5/1966 | Richards | 177/208 X |
| 3,306,383 | 2/1967 | Saxton et al. | 177/136 |
| 3,321,035 | 5/1967 | Tarpley | 177/136 |
| 3,327,795 | 6/1967 | Link | 177/208 |
| 3,603,418 | 9/1971 | Schmidt | 177/136 |
| 3,642,081 | 2/1972 | Hebert | 177/211 X |
| 3,650,340 | 3/1972 | Bradley | 177/136 |
| 3,661,220 | 5/1972 | Harris | 177/136 |

Primary Examiner—Richard B. Wilkinson
Assistant Examiner—Vit W. Miska

[57] ABSTRACT

Means including strain gauges and transducers for accurately reflecting the weight carried by a fifth wheel mounted upon a tractor or the weight carried upon the axles of a vehicle using air bag suspension. The pressure generated in air bags is transmitted by transducer to an amplifier and then to a digital readout, normally located in the cab of the vehicle. To determine the weight upon the axle of the tractor, a load cell is mounted beneath the fifth wheel. Load is reflected by a deflection in the load cell, which is amplified and transmitted to the cab portion of the vehicle.

5 Claims, 8 Drawing Figures

PATENTED DEC 17 1974

3,854,540

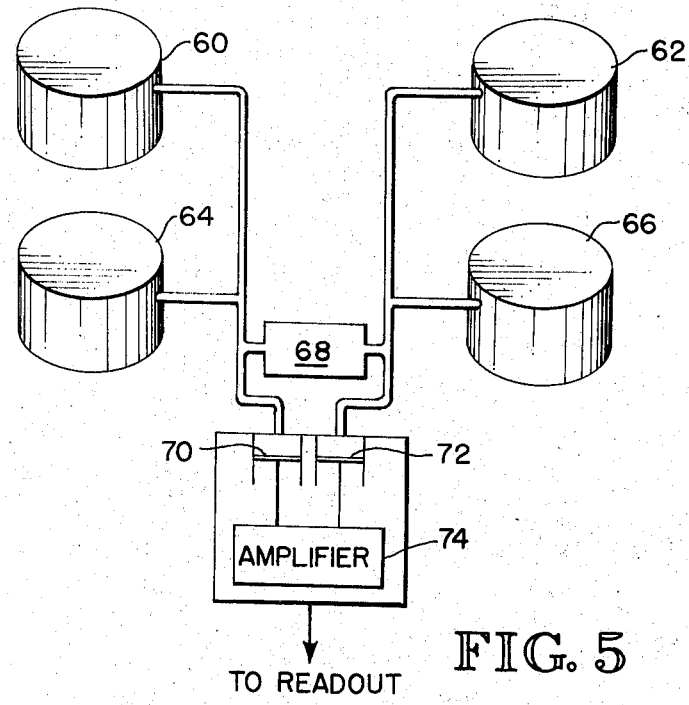
FIG. 5
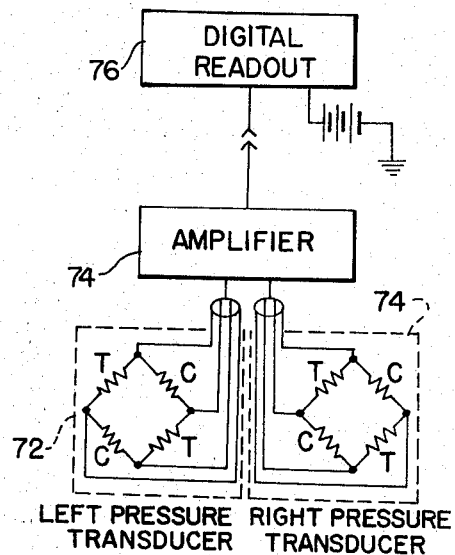
FIG. 6
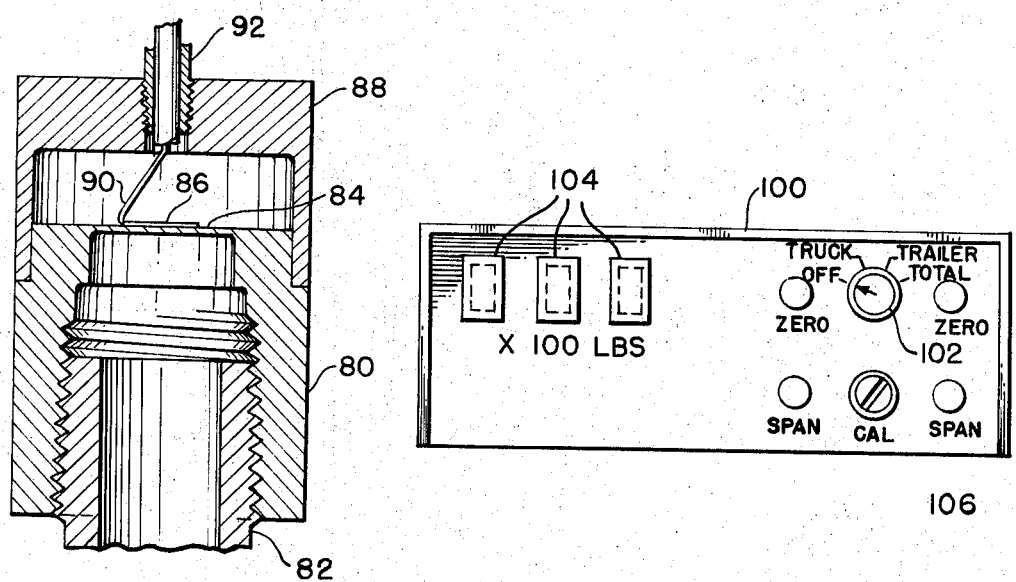
FIG. 7
FIG. 8

VEHICLE WEIGHING MEANS

BACKGROUND OF THE INVENTION

The necessity of having a weighing means for trucks which will be required to travel upon highways which have weight restrictions is readily apparent. The restrictions may be based upon total weight, or upon weight carried by a specific axle. In the past, there have been expensive scale means which were located in a specific geographical area. The driver or truck owner took the vehicle to the scale and weighed it to assure conformance with the law. The disadvantage of this particular method of weighing the vehicle lies in the fact that at the time and place of weighing it is inconvenient, if not impossible, to either shift the load or add to or subtract therefrom. The utilization of a truck which is underloaded many times will cost the vehicle owner the profit upon that particular load whereas the penalty for overloading can be extremely stiff and thereby equally well remove any and all profit from the particular load.

The need for a weighing means has been recognized, particularly in the logging industry and references which explicitly deal with this particular problem are U.S. Pat. NO. 3,603,408 granted to Schmidt, et al. on Sept. 7, 1971 and U.S. Pat. No. 3,661,220 granted to Harris on May 9, 1972. Each of these references utilize a load cell system for detecting the weight upon the frame or similar structural member of the vehicle.

The original emphasis upon weighing of a vehicle was in the logging industry, primarily inspired by the inconvenience of weighing such a vehicle which is loaded in the woods. It is to be noted that many other vehicles are likewise subjected to overload fines, as are logging trucks, and the loss of profit if not loaded to capacity. These vehicles would include any trucks which travel on highways and in particular those utilized for hauling wood chips or the like and are loaded in conditions not conducive to care in loading or ready weighing. Vans which are utilized to carry cargo that may vary in density and thereby vary the load also may easily be overloaded. If the vehicle to be used upon a highway is going to be loaded uniformly with packages having a specific weight, it is relatively simple for the people loading the vehicle to assure that the vehicle is loaded to about its maximum and the load is equally distributed over the supporting structure. However, many of the loads carried by van-type vehicles are, firstly, not packaged in a manner whereby the weight is well known. Further, the load, if it be equipment or the like, may well vary in total weight distribution requiring that the people loading the trailer be extremely cautious as to the placement of the heavier portions within the trailer to permit maximum utility of the vehicle.

With the above noted prior art and problems in mind, it is an object of the invention to adapt a strain gauge or readout system for utilization in a trailer which has a suspension utilizing air bags.

It is another object of the present invention to provide a means for reading the weight carried by the axle of a tractor by utilizing strain gauges mounted to the load cell placed upon the mounting plates supporting the boss upon the fifth wheel which carries the weight of the trailer.

It is another object of the present invention to measure the load as found at the fifth wheel and/or the air bag suspension system and transmit it to a digital readout within the confines of the cab of the vehicle whereby the driver can readily determine the total weight of his vehicle and/or load as well as noting if there has been any shift in the load.

It is another object of the present invention to utilize the increase in pressure generated by a load placed upon an air bag suspension and by means of a transducer generated electrical current, which can then be amplified and utilized in a readout to indicate the weight or stress upon the air bags themselves.

It is yet another object of the present invention to modify the mounting of the fifth wheel of a tractor whereby a load cell is placed beneath the fifth wheel and incorporates strain gauges such that the deflection of the load cell accurately reflects the load carried by the fifth wheel.

BRIEF DESCRIPTION OF THE DRAWINGS

FIG. 5 is a schematic representation of an air bag suspension for a trailer such as shown in FIG. 1.

FIG. 6 is a schematic representation of the circuitry whereby the pressure increase in the air bags of FIG. 5 may be used to generate a readout for weight indication.

FIG. 7 is a schematic representation of a transducer which may be utilized in FIG. 6.

FIG. 8 is an illustrative representation of a readout meter such as may be used with a load cell beneath the fifth wheel.

DETAILED DESCRIPTION OF THE DRAWINGS

Figure 1:
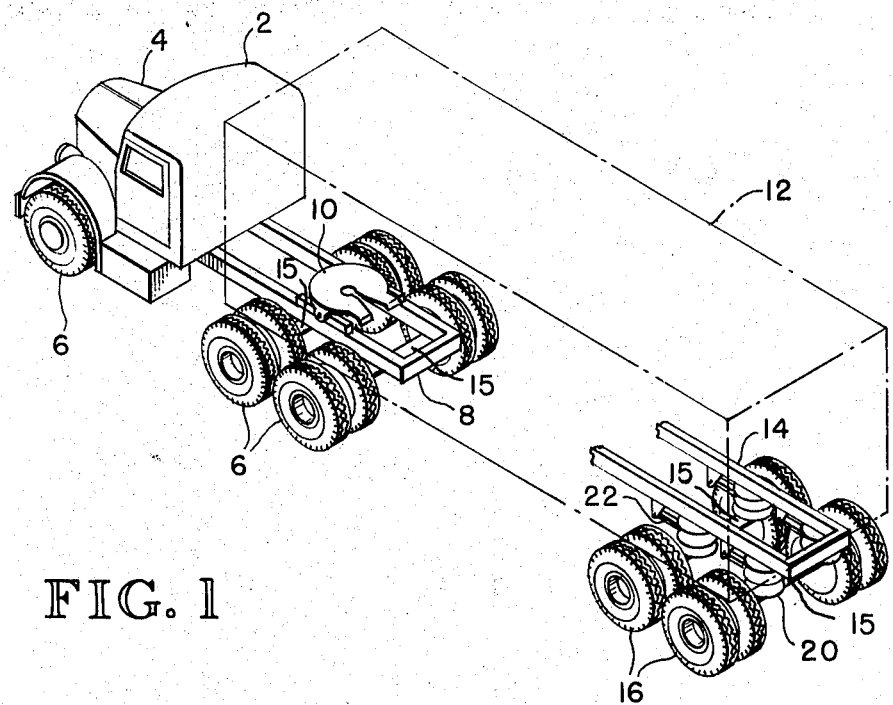
FIG. 1 is a schematic view of a tractor trailer rig having a fifth wheel and air bag suspension of a nature to which the present invention would be applied.

As seen in FIG. 1, the vehicle, upon which it is contemplated that the present invention may most productively be utilized, is a tractor-trailer combination wherein the tractor includes a cab 2, an engine 4, wheels 6, framework 8 and a fifth wheel 10 mounted in the after portion of the framework 8. A van-type trailer 12 is mounted to be towed by the tractor and supported by the fifth wheel 10 and incorporates a framework 14 which is supported upon a pair of tandem axles 15 supporting wheels 16. The shock absorbing suspension mounted between the frame 14 and the axles 15 comprises air bag means 20 mounted upon lever arms 22 pivotally secured to the frame 14.

Figure 2:
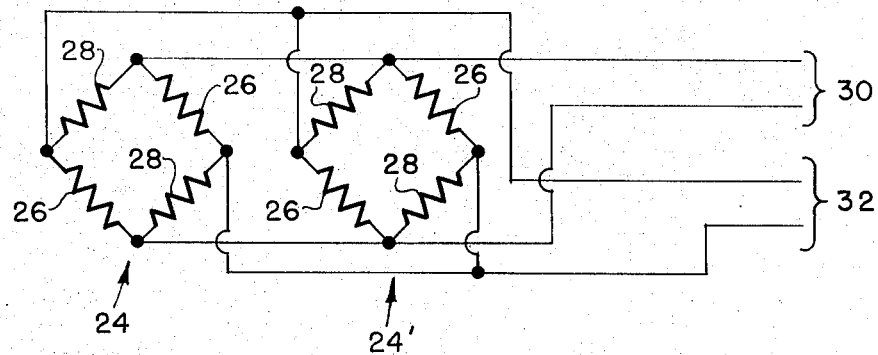
FIG. 2 is a schematic representation of the strain gauge configuration utilized in the fifth wheel weighing system.

As seen in FIG. 2, a suitable arrangement for load cells 24 24' are shown. The strain gauges are carried in the load cell beams of the two load cells 24 24' mounted to the truck frame 8 beneath the fifth wheel 10 as will be described in greater detail hereinafter.

The strain gauges of each load cell 24 24' are connected in a wheatstone bridge circuit. The convolutions of the two contraction strain gauges 26 form two opposite arms of the bridge circuit and the two expansion strain gauges 28 form the other two opposite arms of the bridge circuit. The two bridge circuits are connected in parallel and the circuit input leads 30 and the output leads 34 are interconnected with the circuitry of a readout panel such as seen in FIG. 8.

Figure 3:
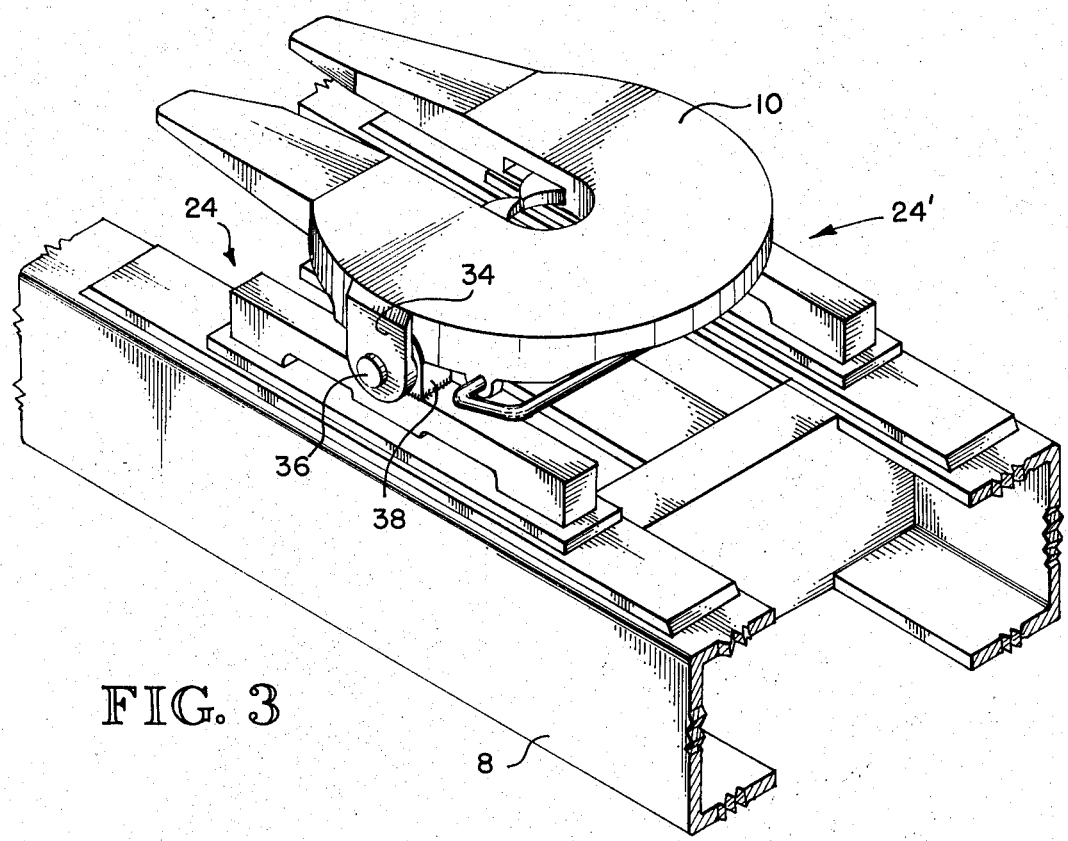
FIG. 3 is a pictoral representation of a fifth wheel upon the frame of a vehicle including a load cell to reflect the weight carried by the fifth wheel.
Figure 4:
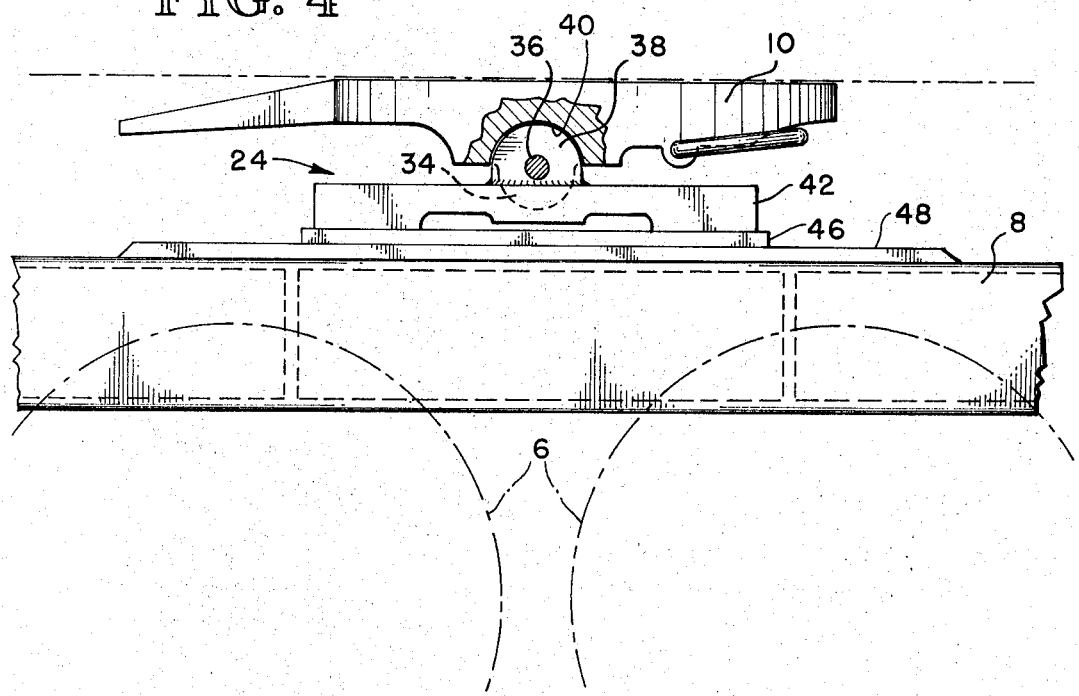
FIG. 4 is an elevational view of the fifth wheel of FIG. 3.

Referring now to FIGS. 3 and 4, it can be seen that the fifth wheel 10 includes a pair of downwardly extending ears 34 each of which have a pin 36 extending therethrough. Pins 36 likewise pass through an upwardly extending boss 38. With particular reference being had to FIG. 4, it is to be noted that the pin 36 does not carry the weight upon the fifth wheel 10. The weight is transmitted via an arcuate indention 40 in the bottom of the fifth wheel 10 which corresponds with the upper portion of the bosses 38 and carries all of the weight of the fifth wheel downwardly therefrom.

Mounted on top of the frame 8, which is supported by wheels 6, is a deflection member 42 which supports the boss 38. As can be seen, the boss 38 is located approximately centrally of the deflection member 42 which is supported by pads 46 – 48 to assure that it is the proper height. Mounted to the deflection member 42 are the strain gauges as seen in FIG. 2, whereby weight upon the fifth wheel causes the deflection of the member 42 which is reflected by the strain gauges and transmitted to the readout as seen in FIG. 8.

Referring now to FIGS. 5, 6 and 7, taken in conjunction, there is shown schematically in FIG. 5 the air bag suspension system illustrative of that noted with respect to FIG. 1. The four air bags denoted 60, 62, 64 and 66 are those which are located upon the rear axle, 60–62, and front axle, 64–66, of the trailer. Located in the line adjacent the air bags is an air control valve 68 to assure that there is a sufficient air supply within the air bags to do the required job.

A pair of pressure transducers 70–72, described in greater detail hereinafter, transmit the increase or decrease in pressure within the system to an electronic input generated by a strain gauge which is then transmitted to amplifier 74.

As seen in FIG. 6, the left pressure transducer 72 comprises a wheatstone bridge which, as noted hereinabove, directs an electrical pulse to the amplifier 74 which amplifies the pulse and suppresses noise. The signal from the amplifier is transmitted to the digital readout 76 which is mounted within the cab of the vehicle. The explanation of the right pressure transducer would be identical and so will not be repeated.

Each of the pressure transducers, noted with respect to FIGS. 5 and 6, is preferably of a configuration similar to that shown in FIG. 7. As seen in FIG. 7, the transducer includes a main body portion 80 having a hollow interior into which is threaded a hollow conduit 82 which is interconnected with the air bag pressure supply system. At the upper portion of the hollow in the main body portion 80 is a diaphragm 84 upon which is secured a strain gauge 86. A cap 88 is slipped over the top of the main body portion 80 forming a relatively sealed area above the diaphragm 84. Wires 90 leading from the strain gauge 86 are fed outwardly through a jam nut or similar securement 92 and then, as described hereinabove, to the amplifier 74. As will be readily apparent, the change in pressure within the air line 82 will cause the diaphragm 84 to flex, resulting in an unbalance in the wheatstone strain gauge 86 the results of which can then be recorded.

As seen in FIG. 8, a typical control panel 100 is shown having a control knob 102 which may be set to one of its four positions; off, truck, trailer or total. As can be seen in this view, the control panel includes a readout section 104, a calibration section 106 and other portions which are more specifically described in corresponding U.S. Pat. application Ser. No. 268,664, filed July 3, 1972, in the name of English, et al.

As can readily be seen, the present invention allows the owner or driver of a truck to readily and easily assure that his truck complies with the weight regulations on the highway upon which he travels, either for the total weight of the vehicle and/or the weight carried by each axle without resort to expensive stationary scales which are both inconvenient and many times inaccessible.

Load cells of the type described in U.S. application Ser. No. 268,664 are preferred. Therefore, the entire contents of such application are incorporated herein by this reference with the intention that such contents may be used to amplify and clarify the disclosure herein. The embodiments of the invention in which an exclusive property or privilege is claimed are defined as follows:

1. A fifth wheel weighing system for sensing the weight of a trailer transmitted to the fifth wheel of a tractor which comprises two load cells spaced apart and secured to the tractor, each load cell comprising transducer means including an elongated bending beam secured at its ends and adapted to deflect upon application of a downward load at the beam midsection, strain sensing means applied to said bending beam to provide electrical signals proportional to vertical loads applied to said beam midsection, and fifth wheel support means secured to and extending above said beam midsection; a fifth wheel in load bearing contact with said fifth wheel support means; connecting means securing said fifth wheel to the fifth wheel support means of each load cell such that said fifth wheel is able to shift position and remain in continuous load bearing contact with both fifth wheel support means such that vertical loads applied to said fifth wheel are transferred to the beam midsections through respective fifth wheel support means.

2. The system of claim 1 wherein each fifth wheel support means comprises a member secured to the respective beam midsection and provided with an arcuate exterior surface which rests in load bearing contact in a corresponding arcuate surface provided on said fifth wheel; and wherein a pivot pin secures said fifth wheel to said member in a manner such that said pin is substantially free of vertical load forces applied to said fifth wheel.

3. The system of claim 1 wherein the trailer is carried on rear wheels by at least two air bag suspension means; two pressure transducers secured to the trailer, one responsive to pressure changes in one air bag suspension means and the other responsive to pressure changes in the other air bag suspension means, each pressure transducer including a pressure-sensitive diaphragm, strain sensing means applied to said diaphragm to provide electrical signals proportional to pressures applied to said diaphragm; amplifier means secured to the trailer combining the electrical signals from the two strain sensing means and providing a combined output; weight readout means electrically coupled to said amplifier means and to the fifth wheel strain sensing means providing a visual indication of trailer weight applied to the air bag suspension means and to the fifth wheel.

4. A fifth wheel load cell for use in pairs for supporting a tractor fifth wheel to sense trailer weights transmitted to the tractor fifth wheel which comprises an elongated bending beam adapted to deflect upon application of a transverse load at the beam midsection, tractor mounting means to which the ends of said bending beam are secured, strain sensing means applied to said bending beam to provide electrical signals proportional to loads applied to said beam midsection, fifth wheel support means secured to and extending outward from said beam midsection and providing an exterior bearing surface for load bearing contact with the underside of a fifth wheel such that vertical loads applied to a fifth wheel are transferred directly to said beam midsection through said fifth wheel support means.

5. The load cell of claim 4 wherein said fifth wheel support means comprises a boss secured to the beam midsection and provided with an arcuate outer surface for load bearing contact with the underside of a fifth wheel.

* * * * *